(12) United States Patent
Takabu

(10) Patent No.: US 10,806,289 B2
(45) Date of Patent: Oct. 20, 2020

(54) CUTTING PORTION OF FOOD CUTTER

(71) Applicant: KABUSHIKI KAISYA LEBEN, Yokohama-shi, Kanagawa (JP)

(72) Inventor: Atsushi Takabu, Kanagawa (JP)

(73) Assignee: KABUSHIKI KAISYA LEBEN, Kanagawa (JP)

( * ) Notice: Subject to any disclaimer, the term of this patent is extended or adjusted under 35 U.S.C. 154(b) by 0 days.

(21) Appl. No.: 16/620,280

(22) PCT Filed: Mar. 27, 2019

(86) PCT No.: PCT/JP2019/013229
§ 371 (c)(1),
(2) Date: Dec. 6, 2019

(87) PCT Pub. No.: WO2019/189379
PCT Pub. Date: Oct. 3, 2019

(65) Prior Publication Data
US 2020/0093311 A1    Mar. 26, 2020

(30) Foreign Application Priority Data
Mar. 30, 2018  (JP) .................. 2018-067016

(51) Int. Cl.
*A47J 17/02* (2006.01)
*B26D 3/28* (2006.01)
(52) U.S. Cl.
CPC .............. *A47J 17/02* (2013.01); *B26D 3/283* (2013.01); *B26D 2003/286* (2013.01); *B26D 2210/02* (2013.01)
(58) Field of Classification Search
CPC .. A47J 43/28; A47J 17/02; A47J 17/04; A47J 17/08; B26B 3/00; B26B 3/04; B26B 3/24; B26D 3/283; B26D 2210/02
(Continued)

(56) References Cited

U.S. PATENT DOCUMENTS 13,901 A * 12/1855 Chapman .................. A43D 5/10
30/279.2
423,150 A * 3/1890 Haines ..................... A47J 17/02
30/279.6
(Continued)

FOREIGN PATENT DOCUMENTS

CN    103957753      7/2014
CN    204708571 U   10/2015
(Continued)

OTHER PUBLICATIONS

International Search Report of PCT/JP2019/013229, dated Jul. 2, 2019, 6 pages including English translation.
(Continued)

*Primary Examiner* — Jason Daniel Prone
(74) *Attorney, Agent, or Firm* — Hamre, Schumann, Mueller & Larson, P.C.

(57) ABSTRACT

Provided is a cutting portion that can easily obtain a large amount of cuttings of a food material in a short time. A cutting portion of a food cutter includes a plurality of blade portions that are provided with blades, and a terminal guide portion located on the most downstream side in the cutting operation direction and functions as a guide by coming in contact with the food material when cutting the food material; wherein the plurality of cutting portions and the terminal guide portion are provided so as to be substantially parallel with each other with gaps in between, and move together as one.

6 Claims, 9 Drawing Sheets

(58) Field of Classification Search
USPC .................. 30/279.2–279.6, 304; D7/695
See application file for complete search history.

(56) References Cited

U.S. PATENT DOCUMENTS

| | | | | | |
|---|---|---|---|---|---|
| 881,329 | A | * | 3/1908 | Nagasse | A47J 17/04 30/315 |
| 1,274,663 | A | * | 8/1918 | Auer | A47J 17/04 30/123.6 |
| 1,348,821 | A | * | 8/1920 | Palinski | B26B 3/04 30/279.6 |
| 1,430,289 | A | * | 9/1922 | Dahmer | A47J 43/25 30/279.6 |
| 1,467,863 | A | * | 9/1923 | Libbing | A47J 17/02 30/279.6 |
| 2,007,647 | A | * | 7/1935 | Herly | A47J 17/02 30/279.6 |
| 2,010,414 | A | * | 8/1935 | Rekonty | A47J 17/02 30/280 |
| 2,173,751 | A | * | 9/1939 | Burkhart | A01F 11/06 30/279.6 |
| 2,321,289 | A | * | 6/1943 | Gamache | A47J 17/02 30/279.6 |
| 3,328,877 | A | * | 7/1967 | Brown | A47J 17/02 D7/695 |
| 4,587,734 | A | * | 5/1986 | Jonsson | A47J 43/25 30/279.6 |
| 4,790,488 | A | * | 12/1988 | Borner | A47J 43/25 30/279.6 |
| 6,619,194 | B1 | * | 9/2003 | Kuan | A47J 17/02 30/279.6 |
| D486,703 | S | * | 2/2004 | Settele | D7/695 |
| D645,697 | S | * | 9/2011 | Hawker | D7/381 |
| D781,669 | S | * | 3/2017 | Takabu | D7/695 |
| 10,085,583 | B2 | * | 10/2018 | Takabu | A47J 17/02 |
| 2005/0262703 | A1 | * | 12/2005 | Best | A47J 17/02 30/279.6 |
| 2012/0085249 | A1 | * | 4/2012 | Kuan | A47J 17/02 30/123.5 |
| 2013/0305935 | A1 | * | 11/2013 | Ebrahim | A47J 17/02 30/123.5 |
| 2014/0230253 | A1 | * | 8/2014 | Ancsel | A47J 17/02 30/123.5 |
| 2016/0331173 | A1 | * | 11/2016 | Takabu | A47J 17/02 |
| 2017/0325615 | A1 | * | 11/2017 | Takabu | A47J 17/02 |

FOREIGN PATENT DOCUMENTS

| | | | | |
|---|---|---|---|---|
| DE | 102017103192 A1 | * | 8/2018 | A47J 17/02 |
| EP | 0509444 B1 | * | 6/1995 | A47J 17/08 |
| EP | 2399492 | | 12/2011 | |
| JP | H11-57248 | | 3/1999 | |
| JP | 2007-313144 | | 12/2007 | |
| JP | 2016-096910 | | 5/2016 | |
| JP | 6077161 | | 2/2017 | |
| JP | 2017-086666 | | 5/2017 | |
| WO | 2016/181570 | | 11/2016 | |

OTHER PUBLICATIONS

Office Action issued for Chinese Patent Application No. 201980002944.3, dated Mar. 27, 2020, 12 pages including English translation.

* cited by examiner

CUTTING PORTION OF FOOD CUTTER

TECHNICAL FIELD

The present invention relates to a cutting portion of a food cutter. This application is based on and claims the benefit of priority from Japanese Patent Application No. 2018-067016 filed on Mar. 30, 2018, and for designated countries where incorporation by reference is allowed, the content described in that application is incorporated into this application by reference.

BACKGROUND ART

Patent Literature 1 describes a peeler.

CITATION LIST

Patent Literature

Patent Literature 1: JP 2007-313144 A

SUMMARY OF THE INVENTION

Technical Problem

A peeler includes a blade body having a blade portion formed on one side of a long hole in the lengthwise direction, and a contact receiving portion formed on the other side of the long hole. In recent years, peelers have come to be used for shredding cabbage, slicing root vegetables, and the like in addition to the original peeling application.

However, in the conventional peeler, a single blade portion is applied to the cutting surface for cutting, so it takes time and labor to make a large amount of cuttings.

Therefore, in view of the above circumstances, an object of the present invention is to provide a cutting portion of a food cutter that can easily obtain a large amount of food cuttings in a short time.

Solution to Problem

The present application includes a plurality of means for solving at least a part of the problems described above, and examples of the means are as described below.

The cutting portion for a food cutter according to one form of the present invention includes: a plurality of blade portions provided with blades; and a terminal guide portion that is located on the most downstream side in the cutting operation direction and that functions as a guide by coming in contact with a food material when cutting the food material; wherein the plurality of blade portions and the terminal guide portion are provided so as to be substantially parallel with each other with gaps in between, and move together as one.

Of the plurality of blade portions, the blade portion on the downstream side of the most upstream blade portion in the cutting operation direction may functions as a guide when the part upstream in the cutting operation direction comes in contact with the food material when cutting the food material.

The gap(s) between the plurality of blade portions may be narrower than the gap between the blade portion of the plurality of blade portions that is closest to the terminal guide portion and the terminal guide portion.

The cutting portion may includes attaching portions for rotatably attaching to holding portions of the food cutter.

The cutting portion may have shaft bases that include rotating shafts for rotatably attaching to the holding portions of the food cutter, and support portions for supporting a plurality of attaching portions extending outside the cutting portion.

The terminal guide portion and the blade portion closest to the terminal guide portion may be formed of an integral material.

The terminal guide portion and the most upstream blade portion in the cutting operation direction may be formed of an integral material.

The blade portion may be a flat blade, a serrated blade, a triangular blade, or a wave-shaped blade.

The cutting portion may be used as a peeler.

The cutting portion may also be used as a slicer.

Effect of the Invention

With the present invention a cutting portion may be provided that can easily obtain a large amount of cuttings of a food material in a short time.

Problems, configurations, and effects other than those described above will be clarified by the following description of embodiments.

DESCRIPTION OF THE EMBODIMENTS

Examples of embodiments of the present invention will be described below with reference to the drawings. It should be noted that the same reference numbers will be given to the components that are common in the following embodiments, and redundant descriptions may be omitted.

First Embodiment

Figures 1A, 1B:
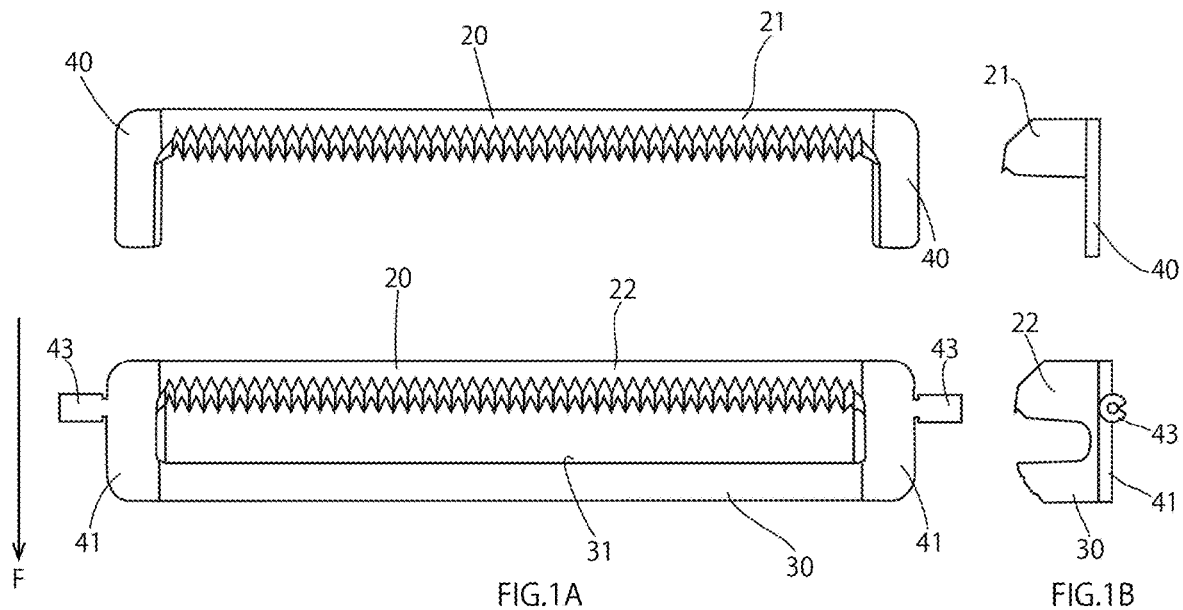
FIGS. 1A to 1E are views for describing a cutting portion according to a first embodiment.
Figures 1C, 1D:
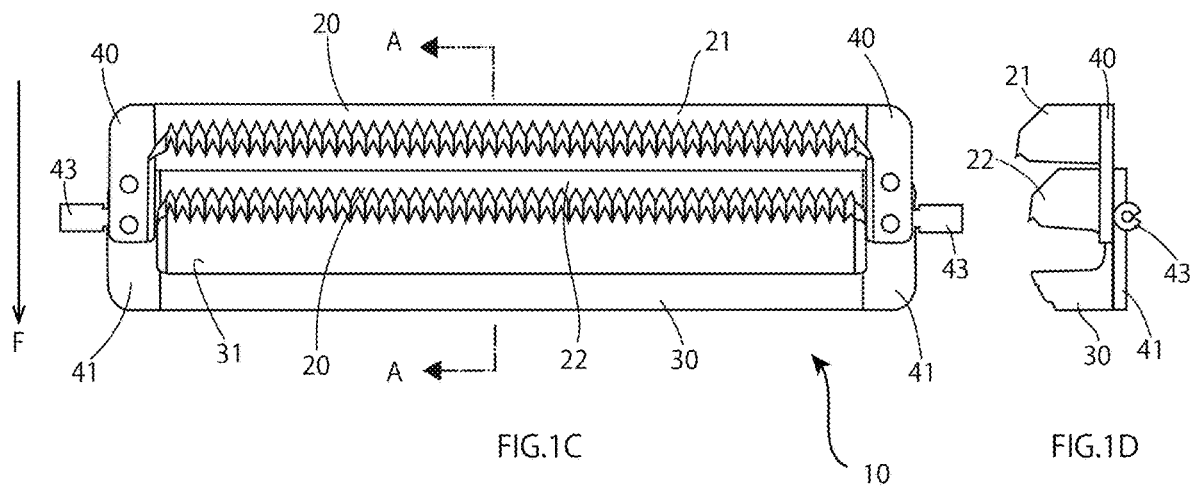
Figure 1E:
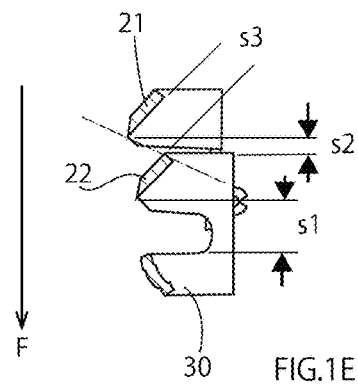

FIGS. 1A to 1E are views for describing a cutting portion according to a first embodiment. FIG. 1A is an exploded front view, FIG. 1B is an exploded right side view, FIG. 1C is a front view of the cutting portion after assembly, FIG. 1D is a right side view of the cutting portion after assembly, and FIG. 1E is a cross-sectional view of section A-A.

As illustrated in FIGS. 1A to 1E, the cutting portion 10 of the present embodiment has a plurality of blade portions 20 and a terminal guide portion 30. The plurality of blade portions 20 include two blade portions, a first blade portion 21 and a second blade portion 22. The plurality of blade portions 20 are portions for cutting food material. The terminal guide portion 30 is a portion that contacts the surface of the food material and guides the cutting operation.

The cutting portion 10 is formed of a stainless steel plate. However, any material may be used as long as cutting is possible.

The first blade portion 21 includes a blade and is located on the most upstream side with in the cutting operation direction F. The terminal guide portion 30 is located on the most downstream side in the cutting operation direction F. The second blade portion 22 is arranged between the first blade portion 21 and the terminal guide portion 30.

The second blade portion 22 and the terminal guide portion 30 are connected by two second connecting portions 41 and are formed of an integral material. The second blade portion 22 and the terminal guide portion 30 that are integrally formed have a long thin plate shape, and are formed in a shape in which an long thin through-hole 31 is provided in the center in the long side direction. The blade part of the second blade portion 22 is formed so as to face the through hole side. The blade part of the second blade portion 22 is formed as a serrated blade. A serrated blade is a triangular blade formed in a triangular shape with the pitch of the cutting blade (blade edge) in a range of 1 mm to 3 mm, and the tip end has an acute angle.

Each of the two second connecting portions 41 is provided with an attaching portion 43. The attaching portion 43 is provided so as to extend to the outer side opposite to the through hole side. The attaching portion 43 is provided so as to be positioned on the extension of the blade part of the second blade portion 22 provided along the long side. In the present embodiment, the attaching portion 43 is provided on the extension of the blade part of the second blade portion 22, however, may also be provided at any position of the second connecting portion 41.

The first blade portion 21 has a long thin plate shape, and a blade is formed on the downstream side in the cutting operation direction F. In addition, the first blade portion 21 includes first connecting portions 40 on both ends of the short side. The first blade portion 21 and the first connecting portions 40 are integrally formed and are substantially U-shaped. The blade part of the first blade portion 21 is formed along the long thin plate shaped long side so as to face the substantially U-shaped inner side. The blade part is formed into a serrated blade. The first connecting portion 40 is formed to have substantially the same length as that of the second connecting portion 41.

The first connecting portion 40 of the first blade portion 21 is spot welded to the second connecting portion 41 of the second blade portion 22. As a result, the first blade portion 21, the second blade portion 22, and the terminal guide portion 30 are connected and integrally formed. Note that, as long as the connecting portions are joined, rivets, adhesion or the like may be used instead of spot welding.

The first connecting portion 40 is joined to the second connecting portion 41 so that about half of the length overlaps. As a result, a gap is formed where the first blade portion 21 and the second blade portion 22 do not overlap. In addition, the upstream portion of the second blade portion 22 in the cutting operation direction F serves as a guide for the first blade portion 21. Furthermore, by forming the gap, it is possible to prevent the cuttings from clogging the cutting portion when the food material is cut, and to efficiently make cuttings of the food material.

When the first connecting portion 40 is joined to the second connecting portion 41, the first blade portion 21, the second blade portion 22, and the terminal guide portion 30 are integrally formed so as to be substantially parallel to substantially the same plane, and thus become the cutting portion 10.

Here, in regard to the gap between the terminal guide portion 30 and each blade portion, the gap between the terminal guide portion 30 and the second blade portion 22 is defined as s1, and the gap between the second blade portion 22 and the first blade portion 21 is defined as s2.

For example, s1 can be 2 mm to 8 mm, and s2 can be 0.4 mm to 6.4 mm. Further, s1: s2=1:0.2 to 0.8. By making the gap s2 narrower than the gap s1, the blade part of the first blade portion 21 catches onto the food material almost simultaneously with when the second blade portion 22 starts to cut a food material such as a leaf vegetable such as cabbage or the like, or a root vegetable such as a daikon radish, carrot or the like, and cutting may be performed efficiently.

As illustrated in FIG. 1E a gap that is formed between the surface side where the first connecting portion 40 of the first blade portion 21 is joined to the second connecting portion 41 and the side surface where the second connecting portion 41 of the second blade portion 22 is joined to the first connecting portion 40 is defined as s3. s3 can be appropriately selected according to a predetermined thickness to be cut. For example, s3 may be adjusted so that the thick part of the cuttings is in the range of 1.0 mm to 8.0 mm. Moreover, s3 is preferably 1.2 mm to 3 mm.

Incidentally, the first blade portion 21 and the second blade portion 22 are formed so as to be substantially parallel to substantially the same plane as the terminal guide portion 30, however, may have a slight angle with respect to the food material surface so as to come in contact with the food material before the terminal guide portion 30.

The cutting portion 10 is used by inserting the attaching portions 43 into holding portions (also referred to as head portions) provided in a grip portion of a cooking utensil (not illustrated) (refer to FIGS. 2A and 2B described later). The attaching portions 43 serve as a shaft that can rotate with respect to the holding portions. That is, pivoting movement is possible around the shaft. In other words, the first blade portion 21, the second blade portion 22, and the terminal guide portion 30 may pivot together as one.

By holding the grip portion of the cooking utensil, bringing the terminal guide portion 30 in contact with the food material and pulling the grip portion in the cutting operation direction F, the food material can be cut by the first blade portion 21 and the second blade portion 22.

By using the cutting portion 10 in this way, it is possible to easily prepare a large amount of fine cuttings of a food material compared with a conventional cutting portion having a single blade.

Note that the gap s2 only needs to be a gap that is large enough so that cuttings do not become clogged, however, may be a gap that is about the same as gap s1.

Moreover, although the first blade portion 21 and the second blade portion 22 are formed as serrated blades, they may be flat blades. Alternatively, one blade portion may be a serrated blade and the other may be a flat blade or a wave-shaped wave blade. Furthermore, one blade portion may be a serrated blade and the other may be a triangular blade of which the angles on the tip ends are obtuse angles.

Modification of the First Embodiment

Figure 2A:
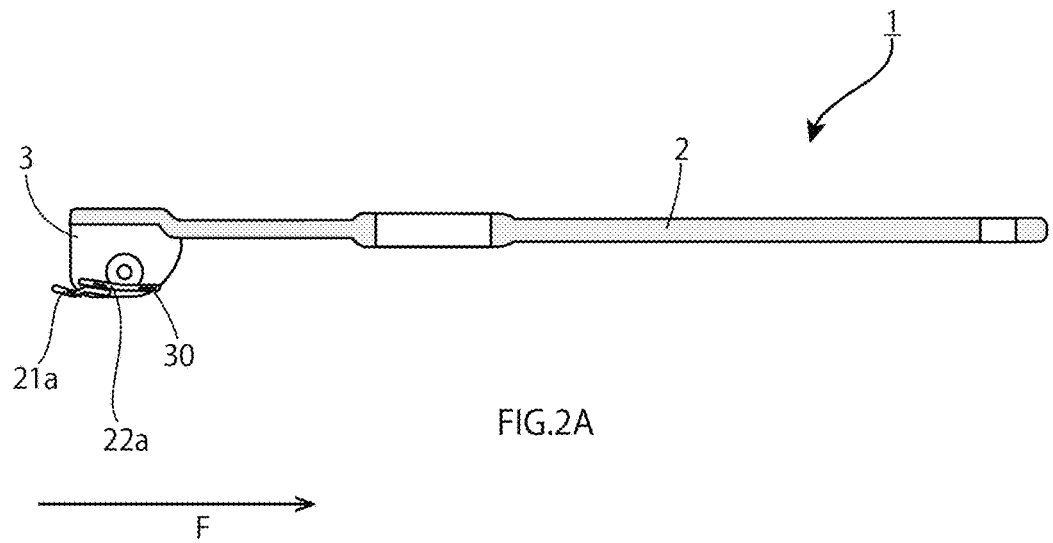
FIGS. 2A and 2B are views for describing a cutting portion according to a modification of the first embodiment.
Figure 2B:
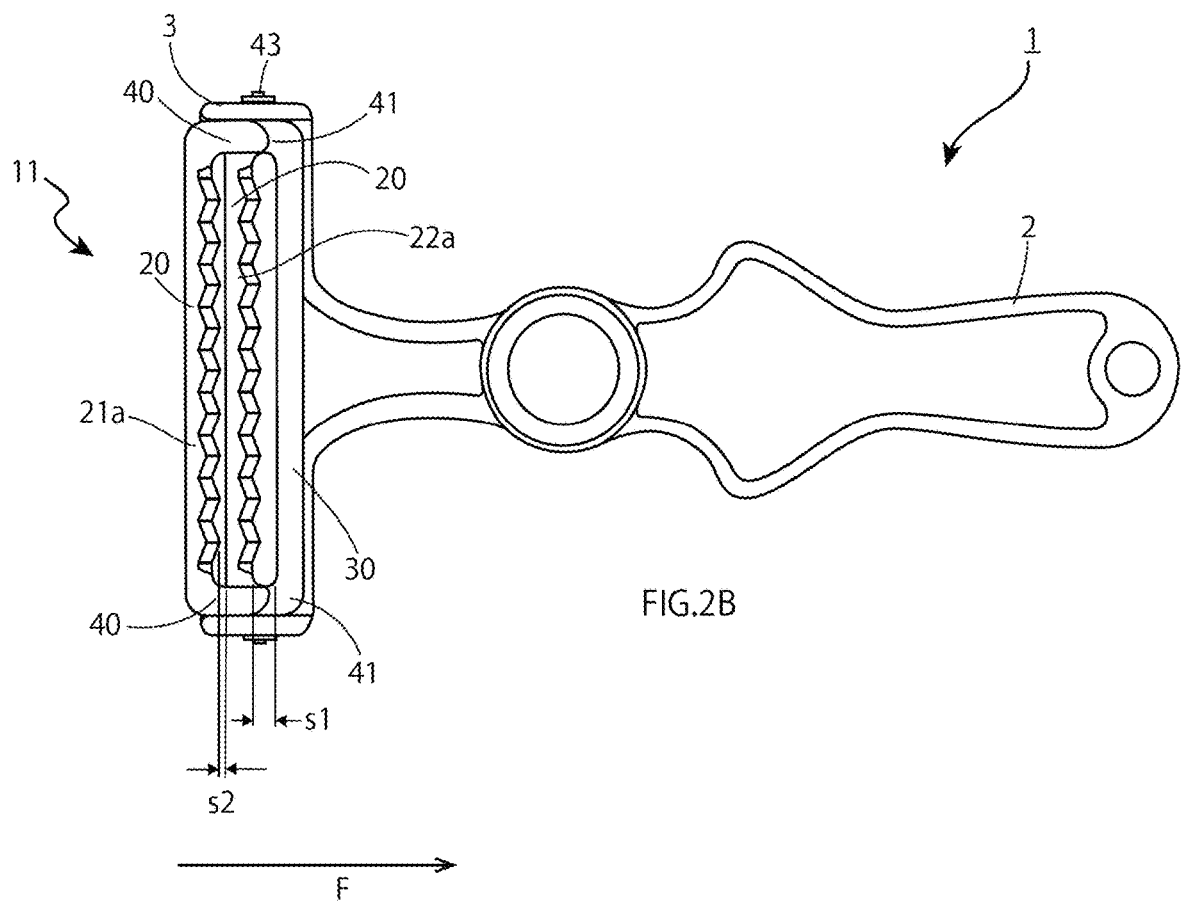

FIGS. 2A and 2B are diagrams illustrating a cutting portion according to a modification of the first embodiment. FIG. 2A is a right side view of a cooking utensil with the cutting portion attached, and FIG. 2B is a front view of a cooking utensil with the cutting portion attached.

The blade parts of first blade portion 21 and the second blade portion 22 are the same as those in the first embodiment except that the blade portions are formed as triangular blades; and in the following the same reference numbers will be given to identical configuration, and only the different points will be described.

The blade parts of the first blade portion 21a and the second blade portion 22a are formed into triangular blades of which the angles on the tip ends are obtuse angles. The first connecting portion 40 is joined to the second connecting portion 41 to form a cutting portion 11.

As illustrated in FIGS. 2A and 2B, the cutting portion 11 is attached by inserting the attaching portions 43 into the holding portions 3 provided in the grip portion 2 of the cooking utensil 1.

By holding the grip portion 2, bringing the terminal guide portion 30 in contact with the food material and pulling the grip portion 2 in the cutting operation direction F, the food material can be cut by the first blade portion 21a and the second blade portion 22a.

By using the cutting portion 11 in this way, it is possible to easily prepare a larger amount of cuttings of a food material compared with a conventional cutting portion having a single blade. Here, as cuttings, it is possible to obtain cuttings in which uneven streaks appear.

Another Modification of the First Embodiment

Figure 3A:
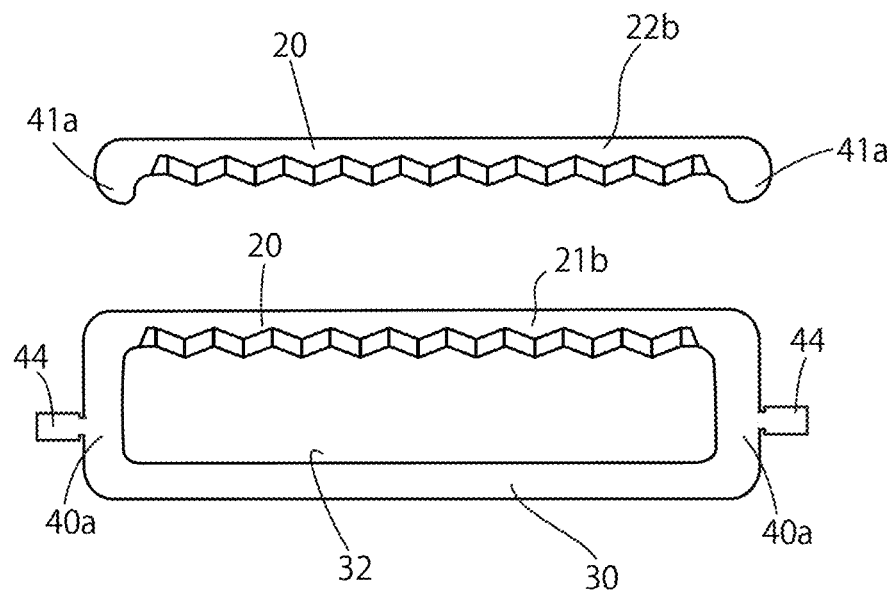
FIGS. 3A and 3B are views for describing a cutting portion according to another modification of the first embodiment.
Figure 3B:
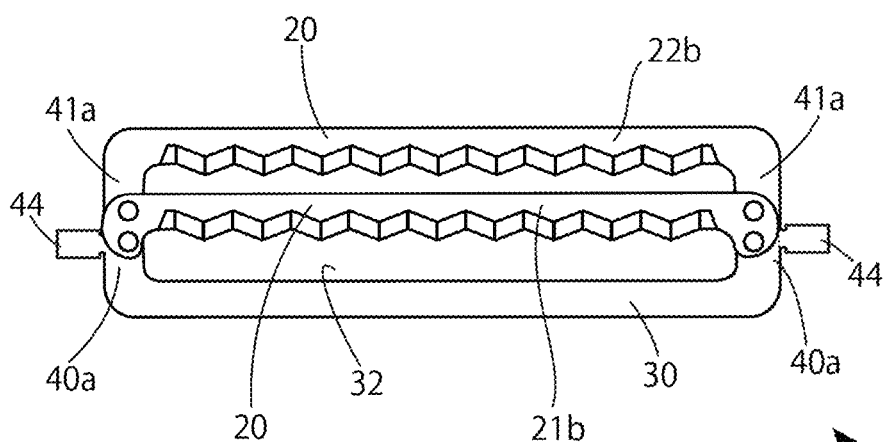

FIGS. 3A and 3B are views for describing a cutting portion according to another modification of the first embodiment. FIG. 3A is an exploded front view, and FIG. 3B is a front view after the cutting portion is assembled. This modification differs from the first embodiment in that the first blade portion 21 and the terminal guide portion 30 are integrally formed, and the second blade portion 22 is formed into a separate plate shape before assembly.

As illustrated in FIGS. 3A and 3B, the first blade portion 21b and the terminal guide portion 30 are connected by two first connecting portions 40a and formed of an integral material. The first blade portion 21b and the terminal guide portion 30 that are integrally formed have a long thin plate shape, and are formed in a shape in which a long thin through-hole 32 is provided at the center in the long side direction. The blade part of the first blade portion 21b is formed so as to face the through hole side. The blade part of the first blade portion 21b is formed as a triangular blade of which the tip-end angle is an obtuse angle.

Each of the two first connecting portions 40a is provided with an attaching portion 44. The attaching portion 44 is provided so as to extend to the outer side opposite to the through hole side. The attaching portion 44 is provided at substantially the center in the lengthwise direction of the first connecting portion 40a. More specifically, the attaching portion 44 is provided at a position closer to the terminal guide portion 30 than the center in the lengthwise direction of the first connecting portion 40a.

The second blade portion 22b has a long thin plate shape, and is provided at both ends with second connecting portions 41a having a length that is about the same as the short side width.

The second connecting portions 41a of the second blade portion 22b are spot welded to the first connecting portions 40a. The second connecting portions 41a are joined near the center in the lengthwise direction of the first connecting portions 40a. As a result, a gap is formed without the second blade portion 22b and the first blade portion 21b overlapping.

As illustrated in FIG. 3B, by joining the second blade portion 22b so as to straddle the through-hole 32 formed by the first blade portion 21b and the terminal guide portion 30, it is possible to form a cutting portion 12 with the lengthwise width of the first connection portion 40a. With this configuration, by providing a step or the like in the first connecting portion 40a, the second blade portion can be positioned, and can be easily and stably attached.

Second Embodiment

Figure 4A:
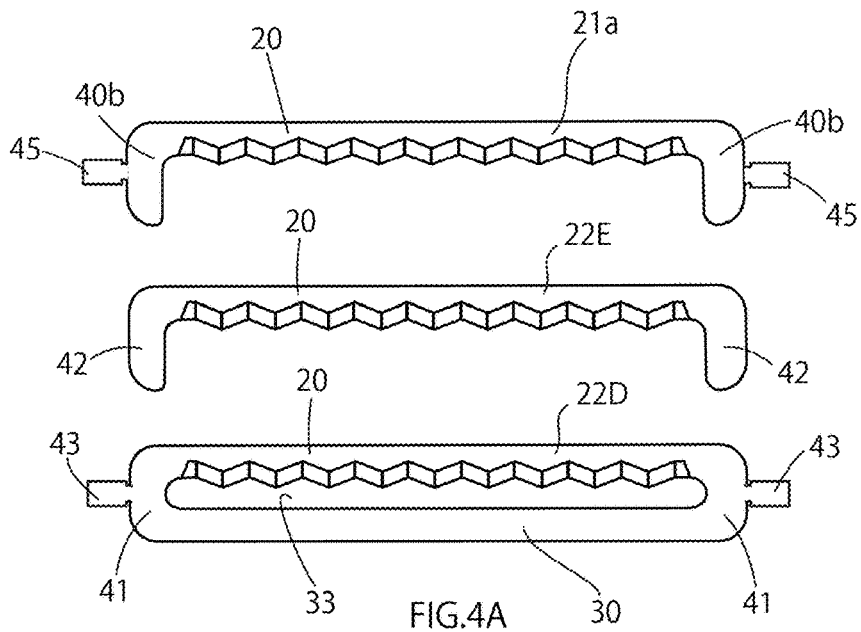
FIGS. 4A to 4C are views for describing a cutting portion according to a second embodiment.
Figure 4B:
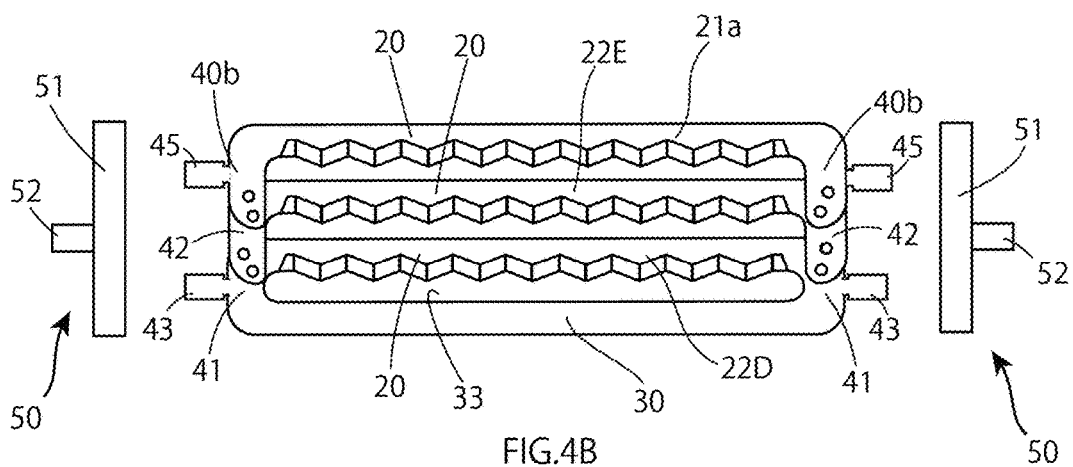
Figure 4C:
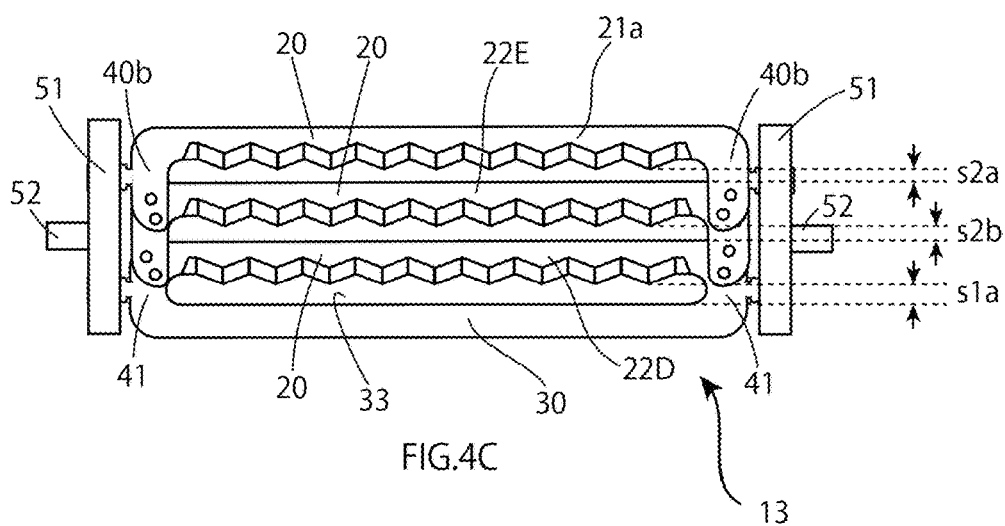

FIGS. 4A to 4C are views for describing a cutting portion 13 according to a second embodiment. FIG. 4A is an exploded front view, FIG. 4B is a partially exploded front view, and FIG. 4C is a front view after the cutting portion is assembled. This embodiment differs from the first embodiment in that the first blade portion includes attaching portions, and having plurality of second blade portions and a shaft base.

As illustrated in FIGS. 4A to 4C, the first blade portion 21a includes attaching portions 45 in the first connecting portion 40b.

A plurality of second blade portions are formed. The second blade portions have a blade portion 22D and a blade portion 22E.

The second blade portion 22E has a long thin plate shape, and a blade is formed on the downstream side in the cutting operation direction F. In addition, the second blade portion 22E includes third connecting portions 42 at both ends of the short side. The second blade portion 22E and the third connecting portions 42 are formed of an integral material and are substantially U-shaped. The blade part of the second blade portion 22E is formed along the long thin plate shaped long side so as to face the substantially U-shaped inner side. The blade part is formed as a triangular blade of which the tip-end angle is an obtuse angle. The first connecting portions 40b, the second connecting portions 41, and the third connecting portions 42 are formed to have substantially the same length.

The second blade portion 22D and the terminal guide portion 30 are connected by two second connecting portions 41 and are formed of an integral material.

A gap s1a that is the width in the direction of the second connecting portions 41 of a through-hole 33 formed by the second blade portion 22D and the terminal guide portion 30 is formed to be narrower than the gap s1 of the first embodiment.

The plurality of second blade portions 22D and 22E are arranged so as to be substantially parallel to substantially the same plane between the most upstream first blade portion 21a and the most downstream terminal guide portion 30 in the cutting operation direction F, and each connecting portion is joined. In this embodiment, the first blade portion 21a is arranged the most upstream, the second blade portion 22E is arranged downstream of the first blade portion 21a, and the second blade portion 22D is arranged upstream of the terminal guide portion 30. In other words, the first blade portion 21a, the second blade portion 22E, the second blade portion 22D, and the terminal guide portion 30 are arranged in that order from the most upstream to the most downstream.

The third connecting portions 42 are joined to the second connecting portions 41 so as to provide a gap s2 that is substantially the same as the gap s1a. In addition, the first connecting portions 40b are joined to the third connecting portions 42 so as to provide a gap s2 that is substantially the same as the gap s1.

As illustrated in FIG. 4B, shaft bases 50 have a plate-shaped support portion 51 and a rotating shaft 52. The rotating shaft 52 is attached to the approximate center of the long side of the support portion 51 so that the support portion 51 and the rotating shaft 52 become substantially T-shaped. The support portion 51 fixes and supports the attaching portion 43 and the attaching portion 45 that are attached to the support portion 51.

The attaching portions 45 of the first connecting portion 40b and the attaching portions 43 of the second connecting portion 41 are attached to the long side of the support portions 51 on the sides where the rotating shafts 52 of the shaft bases 50 are not attached. As a result, as illustrated in FIG. 4C, a cutting portion 13 is formed.

Here, by providing the attaching portions 43 and 45 at a plurality of locations of the first connecting portion 40b and the second connecting portion 41, the load applied to the terminal guide portion 30 and each blade part can be dispersed. Moreover, the overall strength can be increased by forming the rotating shafts 52 of the support portions 51 with a strong material or structure. Particularly, the load at the time of cutting tends to be increased multiple times due to a plurality of blade portions, so it is important to increase the strength.

The rotating shafts 52 of the cutting portion 13 are inserted and attached to the holding portions 3 of the cooking utensil 1 illustrated in FIGS. 2A and 2B. The rotating shafts 52 are rotatably attached to the holding portions 3. That is, pivoting movement is possible around the shaft.

By using the cutting portion 13, a larger amount of cuttings than in the case of the cutting portion 10 of the first embodiment can be easily made. In addition, since gaps are provided in each cutting portion, the cuttings can be efficiently produced without the cuttings becoming clogged between the blade portions.

Note that the gap s2b between the second blade portion 22a and the third blade portion 23 and the gap s2a between the third blade portion 23 and the first blade portion 21a may be narrower than the gap s1a between the second blade portion 22a and the terminal guide portion 30. Alternatively, the gaps may become narrower in the order of gap s1a, gap s2b, and gap s2a. Moreover, the number of blades here is three, however, may be four or more. Furthermore, the attaching portions may be provided at three or more locations for each blade portion.

Modification of the Second Embodiment

Figure 5A:
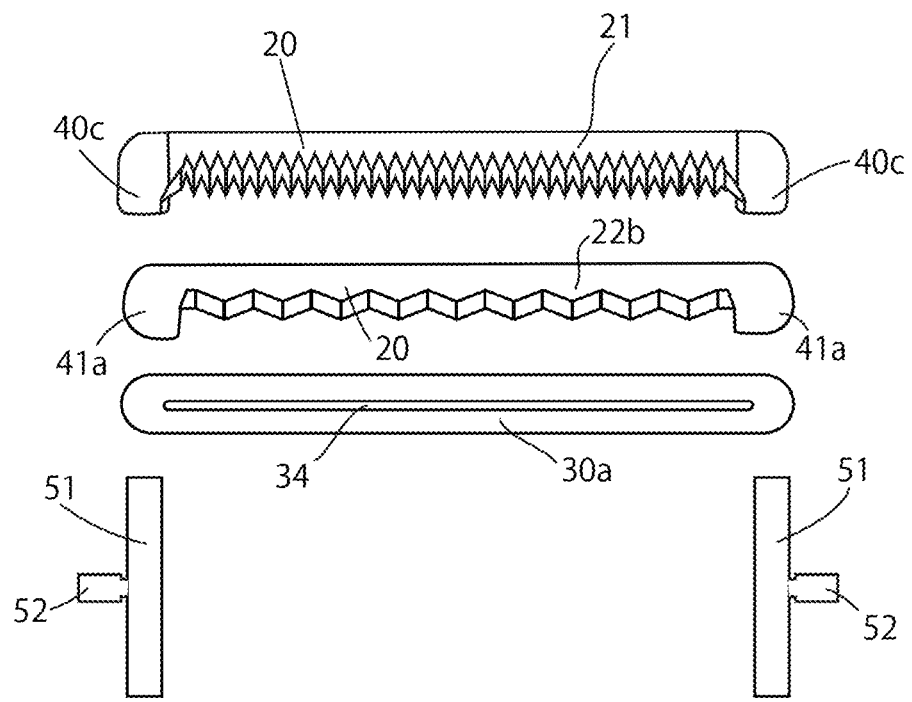
FIGS. 5A and 5B are views for describing a cutting portion according to a modification of the second embodiment.
Figure 5B:
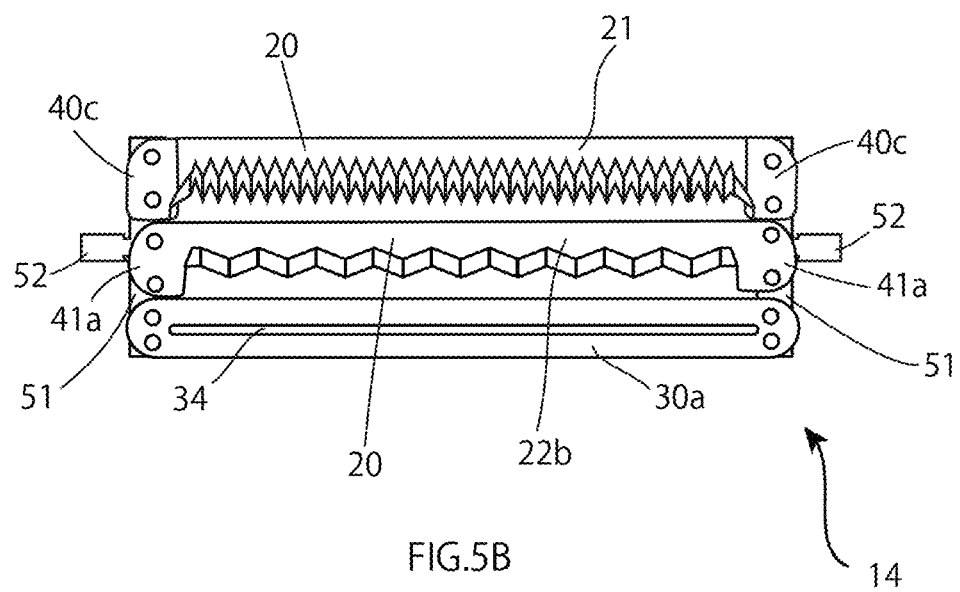

FIGS. 5A and 5B are views for describing a cutting portion 14 according to a modification of the second embodiment. FIG. 5A is an exploded front view, and FIG. 5B is a front view after the cutting portion is assembled. This embodiment differs from the second embodiment in that the terminal guide portion 30 and the second blade portion 22 are formed separately, and the blade parts of the first blade portion 21 and the second blade portion 22 have different shapes from each other.

As illustrated in FIG. 5A, the terminal guide portion 30a has a long thin plate shape, and is formed into a shape in which a rib 34 is provided at the center in the long side direction. By providing the rib 34, the strength of the thin plate-shaped terminal guide portion 30a can be improved, and the terminal guide portion 30 can be prevented from being bent.

The first blade portion 21 has a long thin plate shape, and includes first connecting portions 40c on both ends having a length that is about the same as the width of the short side. The blade part of the first blade portion 21 is formed as a serrated blade.

The second blade portion 22b has a long thin plate shape, and is provided at both ends with second connecting portions 41a having a length that is about the same as the short side width. The blade part of the second blade portion 22b is formed as a triangular blade of which the tip-end angle is an obtuse angle.

As illustrated in FIG. 5B, the terminal guide portion 30a, the first blade portion 21 and the second blade portion 22b are arranged in the order of the terminal guide portion 30a, the second blade portion 22b, and the first blade portion 21, each member is formed separately and attached to a shaft base 50 to form a cutting portion 14.

By using the cutting portion 14, it is possible to easily make cuttings having different shapes at the same time. As a result, it is possible to change the texture of the food, the feel when chewing the food, the appearance, and the like.

Note that the terminal guide portion 30a may not have the rib 34.

Moreover, the blade parts of the first blade portion 21 and the second blade portion 22b may be flat blades, wave-shaped wave blades, or blades having the same shape as each other. Furthermore, various shapes of cuttings can be combined by changing the gaps between the blades and changing the types of blades.

Note that, although not illustrated here, by providing a plurality of vertical blades (blades standing in the vertical direction) on the terminal guide portion or the blade portion arranged upstream of the terminal guide portion in the cutting operation direction F, the cuttings of root vegetable or the like may be cut into shredded cuttings, or by providing vertical blades having wide gaps, the cuttings may be cut into a plurality of strips. Furthermore, at that time, by using vertical blades having widths that are not constant, cutting may be performed with different widths.

Third Embodiment

Figure 6A:
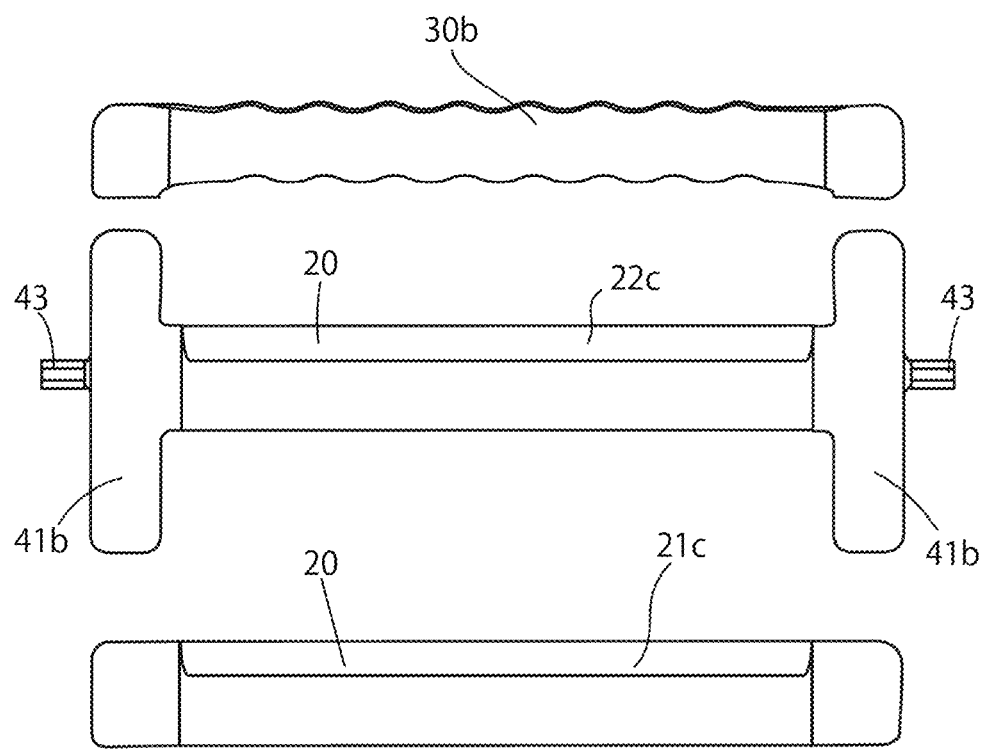
FIGS. 6A and 6B are views for describing a cutting portion according to a third embodiment.
Figure 6B:
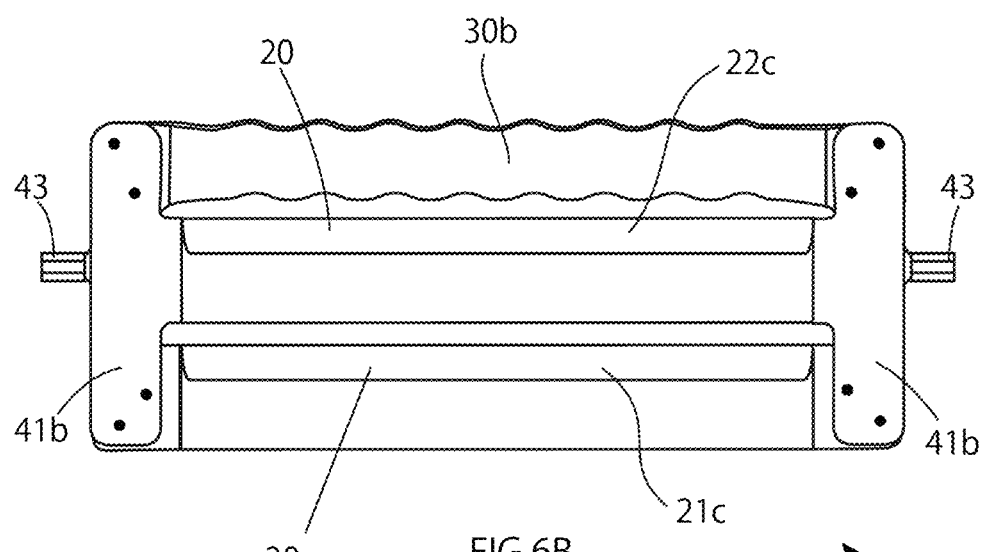
Figure 7A:
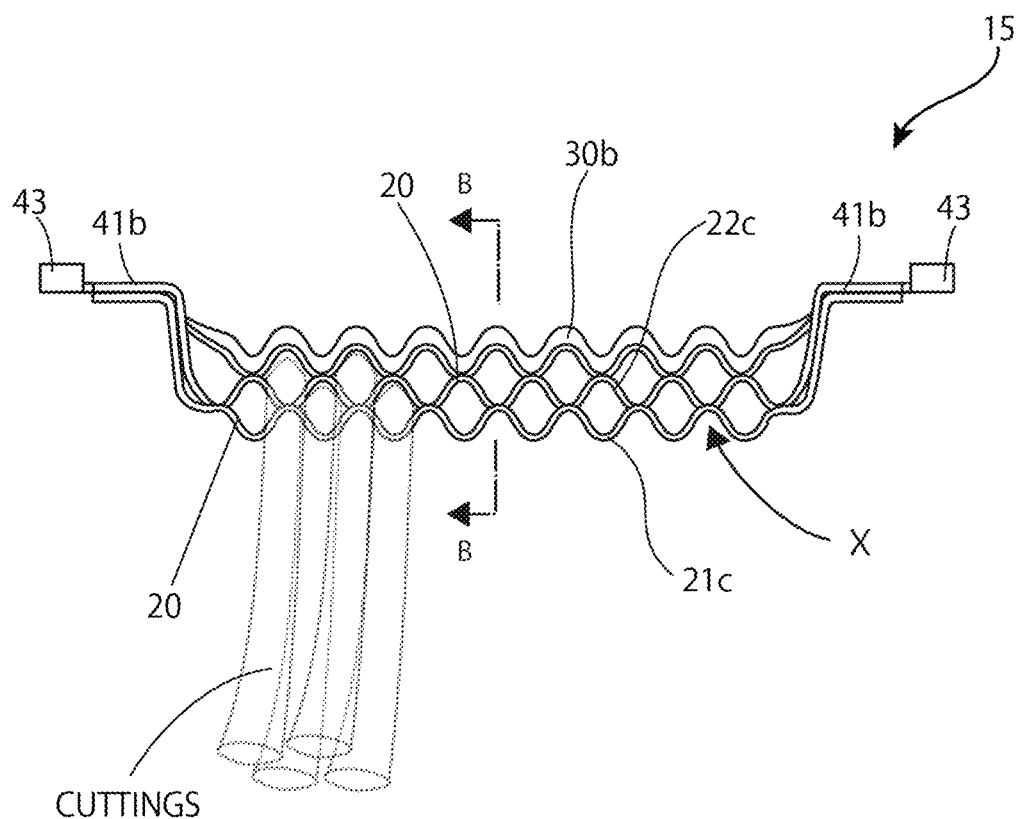
FIGS. 7A and 7B are views for describing a cutting portion according to a third embodiment.
Figure 7B:
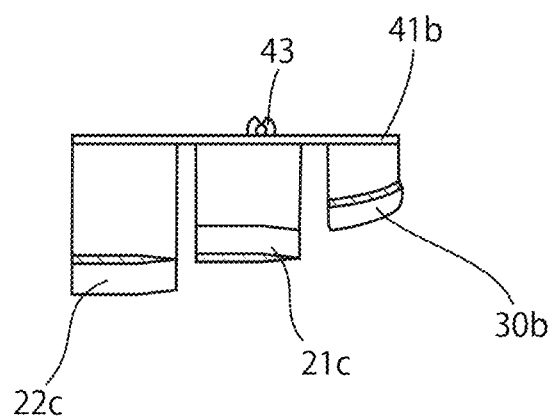

FIGS. 6A and 6B and FIGS. 7A and 7B are views for describing a cutting portion 15 according to a third embodiment. FIG. 6A is an exploded front view, FIG. 6B is a front view after assembling the cutting portion, FIG. 7A is a cross-sectional plan view of the cutting portion, and FIG. 7B is a cross-sectional view of section B-B. This embodiment differs from the first embodiment in that the terminal guide portion 30 and the second blade portion 22 are formed separately, and the terminal guide portion 30 and the first blade portion 21 do not have connecting portions.

As illustrated in FIGS. 6A and 6B, the terminal guide portion 30b is formed in a long thin plate shape. Except for both end portions of the plate-shaped member, both ends of the plate-like long side are formed into a wave shape having repeated unevenness in the width direction.

The first blade portion 21c is formed into a long thin plate shape. A blade is provided on one side of the plate-shaped long side. The blade part, except for both end portions of the plate-shaped member, is formed into a wave shape having repeated unevenness in the thickness direction of the plate-shaped member. Note that in FIGS. 6A and 6B, the wave shape is omitted.

The second blade portion 22c is provided with a blade on one side of the long thin plate-shaped long side. The blade part, except for both end portions of the plate-shaped member, is formed into a wave shape having repeated unevenness in the thickness direction of the plate-shaped member. Note that in FIGS. 6A and 6B, the wave shape is omitted. The plate-shaped member including the blade part and the second connecting portions 41b is formed of an integral material, and the second blade portion 22c has a substantially H-shaped plate shape. In other words, the second connecting portions 41b are perpendicularly provided on both sides of the short side of the long thin plate-shaped member where the blade part is formed so that the plate-shaped flat surfaces are on the same plane.

The terminal guide portion 30b is joined to one end of the second connecting portions 41b on the side where the blade of the second blade portion 22c is provided. In addition, the first blade portion 21c is joined to the other end of the second connecting portions 41b so that the blade part of the first blade portion 21c faces the portion on the upstream side with respect to the cutting operation direction of the second blade portion 22c.

As illustrated in FIG. 7A, the terminal guide portion 30b, the second blade portion 22c, and the first blade portion 21c are bent so that the wave-shaped guide portion and the blade part protrude from the second connecting portion 41b in the thickness direction of the plate-shaped member. The degree of protrusion is formed such that the terminal guide portion 30b, the second blade portion 22c, and the first blade portion 21c become deeper in this order.

As illustrated in FIG. 6B, the terminal guide portion 30b and the first blade portion 21c are joined to the second connecting portions 41b of the second blade portion 22c to form the cutting portion 15.

As indicated by the arrow portion X in FIG. 7A, by adjusting the degree of protrusion so that the convex portions of the first blade portion 21c overlap the concave portions of the second blade portion 22c when viewed from the side, noodle shaped cuttings can be obtained. On the other hand, by adjusting the degree of protrusion so that convex portions of the first blade portion 21c and the concave portions of the second blade portion 22c have a gap when viewed from the side, plate-shaped cuttings having a wave can be obtained.

For example, by providing a gap between the convex portions of the first blade portion 21c and the concave portions of the second blade portion 22c, it is possible to form cuttings having a shape in which noodles are connected side by side.

Moreover, by configuring the convex portions of the first blade portion 21c and the convex portions of the second blade portion 22c so as to face each other, wave-shaped continuous cuttings having substantially the same thickness can be formed.

Alternatively, by configuring the convex portions of the first blade portion 21c and the convex portions of the second blade portion 22c so as to be shifted by a half a peak, wave-shaped continuous cuttings having different thicknesses can be formed.

Therefore, by using this cutting portion 15, food material can be made into noodle-shaped (flat-plate shaped) cuttings. The terminal guide portion 30b has a wave shape, so the terminal guide portion 30b fits into the waves formed on the food material surface by cutting once, so the cutting operation can be easily repeated without the guide portion floating. Moreover, since there are two blade portions, cuttings can be made efficiently. Furthermore, by changing the convex portions of the first blade portion 21c and the convex portions of the second blade portion 22c, or by changing the gap between these blade portions, various cuttings can be formed. In other words, by providing a gap between the first blade portion 21c and the second blade portion 22c, or by overlapping the convex portions and the concave portions of the respective blade portions or by overlapping or shifting half a peak the convex portions and the convex portions of the respective blade portions, various shapes of cuttings can be made.

Embodiments of a cutting portion of a food cutter according to the present invention were described above, however, these are only examples of embodiments of the present invention, and the invention is not limited to these. The present invention includes combinations of the above embodiments and various modifications.

Figure 8A:
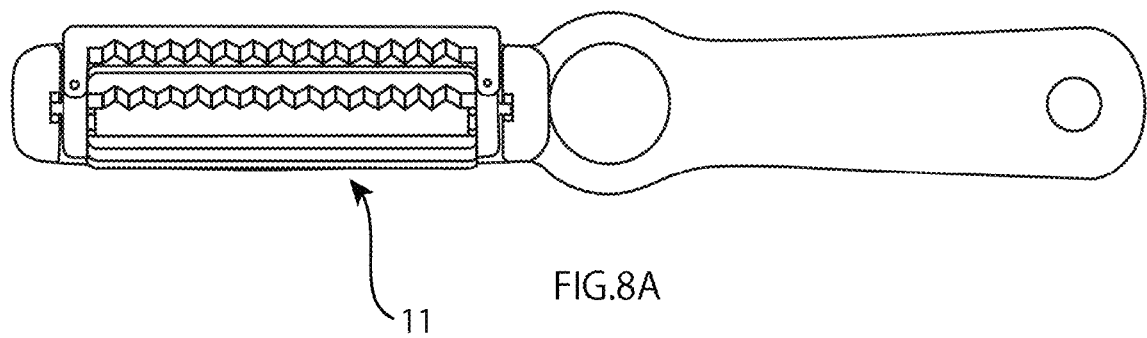
FIGS. 8A and 8B are views illustrating an example of use of a cutting portion according to a modification of the first embodiment.
Figure 8B:
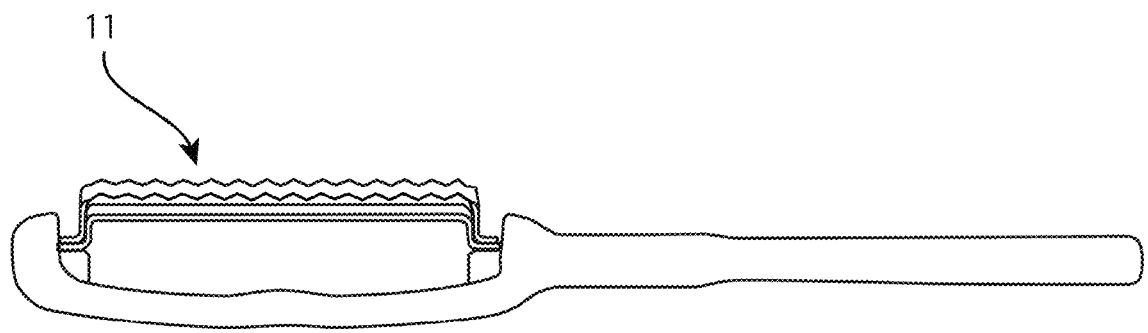
Figure 9:
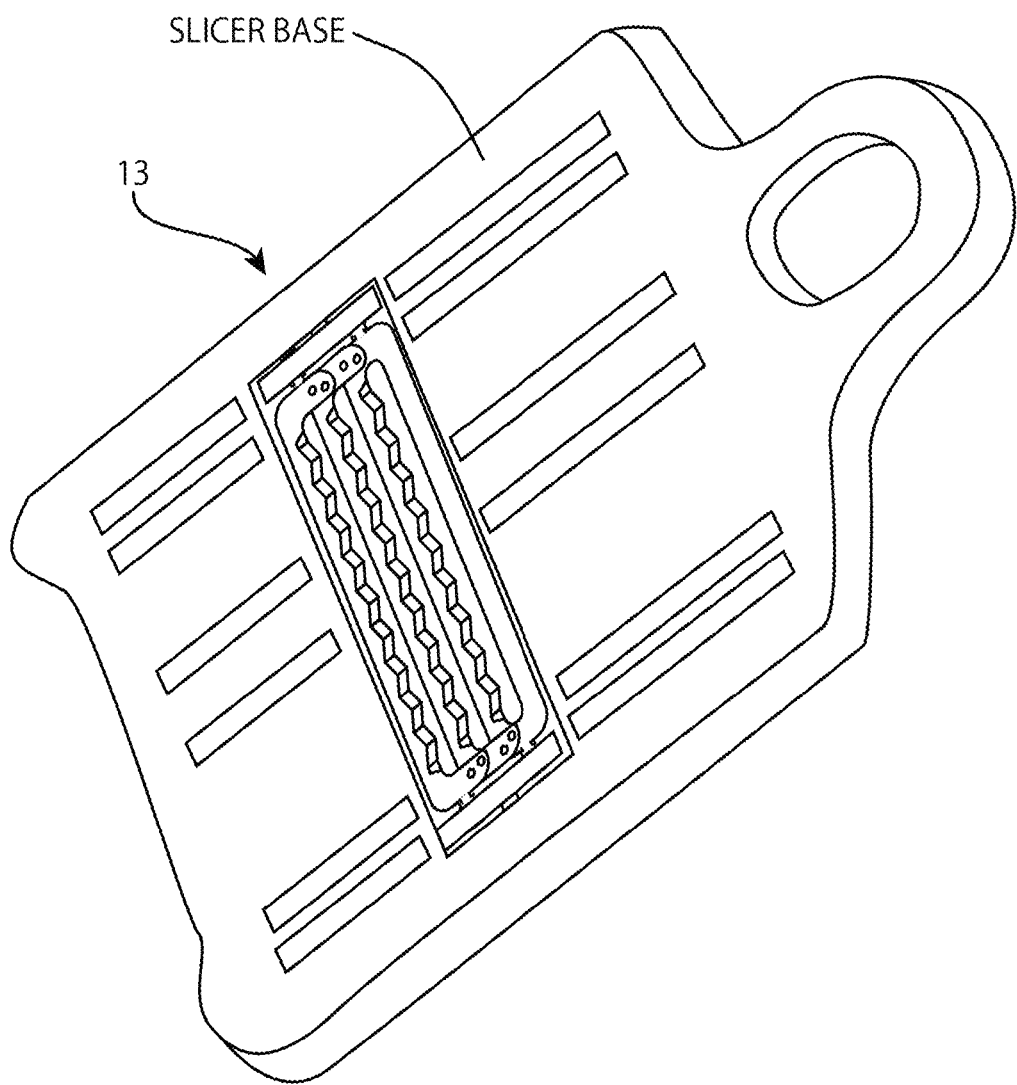
FIG. 9 is a view illustrating an example of use of a cutting portion according to the second embodiment.

For example, as illustrated in the front view of FIG. 8A and a left side view of FIG. 8B, the present invention can be used as an I-shaped peeler with the cutting portion 11 attached. A plurality of cutting portions 11 may also be provided. In addition, as illustrated in FIG. 9, the cutting portion 13 may also be attached to a slicer base and used. The cutting portion 11 may have a blade on the downstream side of the terminal guide portion 30. Moreover, as long as there is a plurality of blade portions 20 that move integrally, such as the first blade portion and the second blade portion, the terminal guide portion 30 described above need not be provided.

It should be noted that not all the combinations of features described in the embodiments are necessarily essential to the means for solving the problems of the invention.

DESCRIPTION OF REFERENCE NUMBERS 10, 11, 12, 13, 14, 15: Cutting portion
20: Blade portion
21, 21a, 21b, 21c: First blade portion
22, 22a, 22b, 22c, 22D, 22E: Second blade portion
30, 30a, 30b: Terminal guide portion
31, 32, 33: Through-hole
34: Rib
40, 40a, 40b, 40c: First connecting portion
41, 41a, 41b: Second connecting portion
42: Third connecting portion
43, 44, 45: Attaching portion
50: Shaft base
51: Support portion
52: Rotating shaft
F: Cutting operation direction
s1, s2: Gap

The invention claimed is:

1. A cutting portion configured for rotatable attachment to a grip portion to form a food cutter, comprising:
   a first elongated, plate-shaped blade portion having opposite ends thereof secured respectively to first and second connecting portions, the first elongated, plate-shaped blade portion includes a first blade;
   a second elongated, plate-shaped blade portion parallel to the first elongated, plate-shaped blade portion and having opposite ends thereof secured respectively to the first and second connecting portions, the second elongated, plate-shaped blade portion includes a second blade;

an elongated, plate-shaped terminal guide portion parallel to the first elongated, plate-shaped blade portion and parallel to the second elongated, plate-shaped blade portion, the elongated, plate-shaped terminal guide portion having opposite ends thereof secured respectively to the first and second connecting portions;

the second elongated, plate-shaped blade portion is disposed between the first elongated, plate-shaped blade portion and the elongated, plate-shaped terminal guide portion;

a first shaft connected to the first connecting portion, the first shaft extending in a direction away from the second elongated, plate-shaped blade portion; and a second shaft connected to the second connecting portion, the second shaft extending in a direction away from the second elongated, plate-shaped blade portion, wherein the first shaft and the second shaft rotatably connect the cutting portion to the grip portion whereby the first elongated, plate-shaped blade portion, the second elongated, plate-shaped blade portion and the elongated, plate-shaped terminal guide portion are rotatable together relative to the grip portion about rotation axes of the first shaft and the second shaft.

2. The cutting portion according to claim 1, further comprising:
a first gap defined between the first elongated, plate-shaped blade portion and the second elongated, plate-shaped blade portion;
a second gap defined between the second elongated, plate-shaped blade portion and the elongated, plate-shaped terminal guide portion;
wherein the first gap is less than the second gap.

3. The cutting portion according to claim 1, wherein the first blade faces in a first direction toward the elongated, plate-shaped terminal guide portion.

4. The cutting portion according to claim 3, wherein the second blade faces in the first direction toward the elongated, plate-shaped terminal guide portion.

5. The cutting portion according to claim 1, wherein the first blade and the second blade are a flat blade, a serrated blade, a triangular blade, or a wave-shaped blade.

6. A food cutter, comprising:
a grip portion;
the cutting portion of claim 1 rotatably connected to the grip portion by the first shaft and the second shaft.

* * * * *